United States Patent
Nicolas et al.

(10) Patent No.: US 7,619,691 B2
(45) Date of Patent: Nov. 17, 2009

(54) PICTURE SIGNAL ENHANCEMENT

(75) Inventors: Marina Marie Pierre Nicolas, Eindhoven (NL); Michel Wouter Nieuwenhuizen, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 1834 days.

(21) Appl. No.: 09/958,330

(22) PCT Filed: Feb. 13, 2001

(86) PCT No.: PCT/EP01/01653

§ 371 (c)(1),
(2), (4) Date: Oct. 9, 2001

(87) PCT Pub. No.: WO01/59183

PCT Pub. Date: Aug. 16, 2001

(65) Prior Publication Data
US 2002/0180893 A1    Dec. 5, 2002

(30) Foreign Application Priority Data
Feb. 14, 2000    (EP) .................................. 00200470

(51) Int. Cl.
*H04N 1/409* (2006.01)
*H04N 5/21* (2006.01)

(52) U.S. Cl. ........................ 348/672; 348/673; 348/687; 348/652; 382/168; 358/522

(58) Field of Classification Search ................. 348/672, 348/675, 673, 652, 687, 630, 576, 577, 627, 348/252, 253; 382/168, 169, 254, 266, 274; 358/522, 447
See application file for complete search history.

(56) References Cited

U.S. PATENT DOCUMENTS

| | | | | |
|---|---|---|---|---|
| 4,639,769 A * | 1/1987 | Fleisher et al. | ............... | 348/672 |
| 5,140,649 A * | 8/1992 | Kageyama | .................. | 382/167 |
| 5,294,986 A * | 3/1994 | Tsuji et al. | ................... | 348/672 |
| 5,315,389 A * | 5/1994 | Izawa et al. | .................. | 348/672 |
| 5,450,502 A * | 9/1995 | Eschbach et al. | ............ | 382/169 |
| 5,581,370 A * | 12/1996 | Fuss et al. | .................... | 358/447 |
| 5,808,697 A * | 9/1998 | Fujimura et al. | ............ | 348/672 |
| 5,822,453 A * | 10/1998 | Lee et al. | .................... | 382/169 |
| 5,963,665 A * | 10/1999 | Kim et al. | ................... | 382/169 |
| 6,078,686 A * | 6/2000 | Kim | ........................... | 382/167 |
| 6,205,257 B1 * | 3/2001 | Eschbach | .................... | 382/261 |

(Continued)

FOREIGN PATENT DOCUMENTS

| | | |
|---|---|---|
| EP | 0747855 | 12/1996 |
| EP | 0833501 | 4/1998 |

*Primary Examiner*—David L Ometz
*Assistant Examiner*—Jean W Désir

(57) ABSTRACT

In a method of picture signal enhancement, a picture signal is subjected (3, 7) to a histogram-based picture signal modification based on a luminance level distribution over a whole picture or a first part of the picture, and the histogram-based picture signal modification is locally adjusted (5) in dependence on locally measured picture signal properties other than contrast and brightness, the locally measured picture signal relating to second parts of the picture that are each substantially smaller than the whole picture or the first part of the picture, the second parts being within the whole picture or the first part of the picture. Preferably, the second parts are individual pixels.

6 Claims, 4 Drawing Sheets

U.S. PATENT DOCUMENTS

| | | | |
|---|---|---|---|
| 6,219,447 B1 * | 4/2001 | Lee ............................ | 382/168 |
| 6,373,533 B1 * | 4/2002 | Kawabata et al. ........... | 348/672 |
| 6,381,278 B1 * | 4/2002 | Shin et al. .............. | 375/240.16 |
| 6,463,173 B1 * | 10/2002 | Tretter ........................ | 382/168 |
| 6,507,372 B1 * | 1/2003 | Kim ........................... | 348/630 |
| 6,556,311 B1 * | 4/2003 | Benear et al. ................ | 358/1.9 |
| 6,650,774 B1 * | 11/2003 | Szeliski ....................... | 382/169 |
| 6,694,051 B1 * | 2/2004 | Yamazoe et al. ............ | 382/167 |
| 6,741,736 B1 * | 5/2004 | Jaspers ....................... | 382/169 |

* cited by examiner

PICTURE SIGNAL ENHANCEMENT

BACKGROUND OF THE INVENTION

1. Field of the Invention

The invention relates to a method and device for picture signal enhancement, as well as to a display apparatus comprising such a picture signal enhancement device.

2. Description of the Related Art

European Patent Application No. EP-A-0,747,855, corresponding to U.S. Pat. No. 5,581,370, discloses a method of improving the contrast in a natural scene image. A relevant histogram of the image is derived from a selected subset of local histograms representing regions of the image. The signal describing the histogram is operated on with a filter having the characteristic of weakening strong peaks and valleys in the function, but not effecting flat portions of the signal. The filtered histogram signal is used for controlling the TRC mapping in a device at which the image is to be printed. To assure optimum selection of local histograms, regions including the black point and white point of an image are determined and added to the subset of local histograms representing regions of the image.

European Patent Application No. EP-A-0,833,501, corresponding to U.S. Pat. No. 6,078,686, discloses an image enhancement circuit in which an enhanced luminance signal is output by independently equalizing histograms for sub-images divided on the basis of the mean value of the received luminance signal. A local contrast defined as a difference between the value of an input sample with respect to the enhanced luminance signal and each value obtained by low-pass filtering the samples in a predetermined-sized window including the input sample, and the input sample value is adaptively weighted according to a detected local contrast, so that a changed luminance signal is output.

In the field of picture improvement, histogram modification algorithms are contrast/detail enhancement algorithms based on the luminance level distribution over a whole picture (or the whole relevant part of it). Because the measurement is made globally and does not take into account textures or color components, histogram modification algorithms can be less optimized in special texture or color regions. Typical local histogram modification algorithms, based on local measurement, are usually not suitable for picture improvement because they lead to continuity artifacts. A common version of such a typical local histogram modification algorithm is first to decompose the picture in simple spatial blocks, either orthogonal ones or corresponding to the limits of objects in the picture, and then to apply the same algorithm for each block, but only taking into account the histogram distribution of the given block. A major problem in this kind of algorithm is formed by the "blocking" artifacts.

Another more elaborate version is to first decompose the picture in different zones depending on their color/texture properties, and then apply different algorithms for the different zones to optimize individually each color/structure block. A major problem in this kind of algorithm is the continuity problem due to the switching of one algorithm to another and the artifacts due to the fact that the detection can never be perfect.

SUMMARY OF THE INVENTION

It is, inter alia, an object of the invention to provide an improved picture signal enhancement.

In a method of picture signal enhancement in accordance with a primary aspect of the invention, a picture signal is subjected to a histogram-based picture signal modification based on a luminance level distribution over a whole picture or a first part of the picture, and the histogram-based picture signal modification is locally adjusted in dependence on locally measured picture signal properties other than contrast and brightness, the locally measured picture signal properties relating to second parts of the picture that are each substantially smaller than the whole picture or the first part of the picture, the second parts being within the whole picture or the first part of the picture. Preferably, the second parts are individual pixels. While the second parts for which picture signal properties are measured and for which the histogram-based picture signal modification is locally adjusted, are each substantially smaller than the whole picture or the first part of the picture, it might very well turn out that (substantially) identical local adjustments are made for a substantial part of the whole picture or the first part, for example, if skin tone turns out to occupy such a substantial part.

These and other aspects of the invention will be apparent from and elucidated with reference to the embodiments described hereinafter.

DESCRIPTION OF THE PREFERRED EMBODIMENTS

Figure 1:
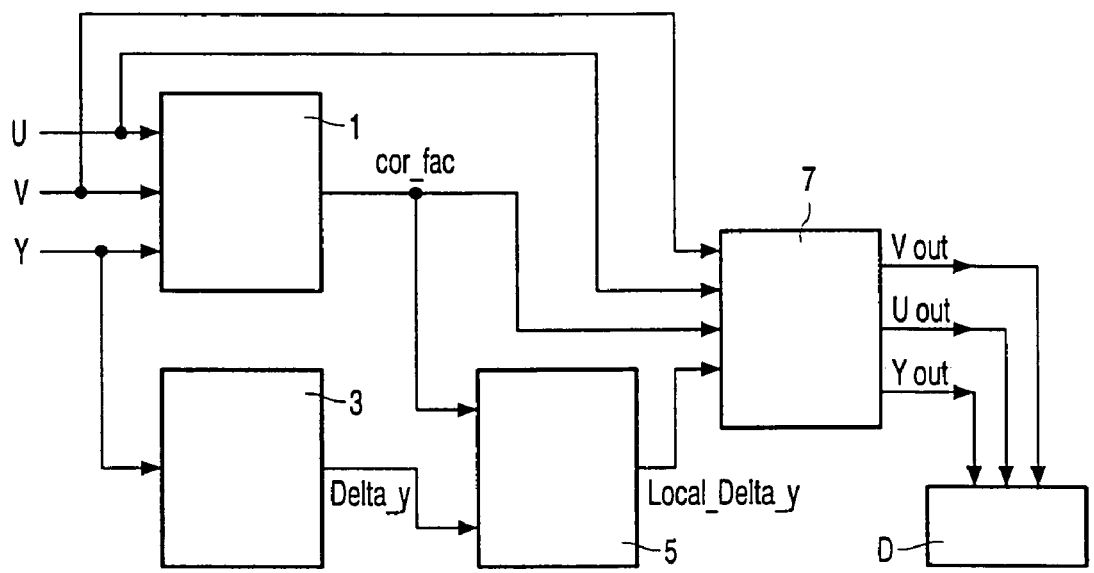
FIG. 1 shows a basic block diagram of a first embodiment of a display apparatus comprising a picture signal enhancement device according to the invention.

The solution proposed by the present invention is a slight local modulation of the original histogram modification, where the local modulation parameter is defined by the local color or texture characteristics. A basic block diagram of the solution is shown in FIG. 1.

In the local color/texture detection block 1, different measurements of YUV are done for each pixel to determine whether the pixel belongs to an area with particular color or textures characteristics, to obtain a correction factor cor-fac that will be explained in detail below. The luminance signal Y is also applied to a histogram modification block 3 to obtain a value delta_y. The correction factor cor_fac and the histogram value delta_y are applied to a local color/texture correction block 5 to produce a value local_delta_y. A UV histogram correction block 7 produces output values Yout, Uout and Vout in response to the input UV signals, the correction factor cor_fac, and the value local_delta_y.

For each detection type, a correction factor cor_fac is defined with the values:

0 if the pixel is outside or at the limits of the corresponding detection domain, and Max value at the center of the corresponding detection domain.

The value of the correction factor cor_fac increases continuously as the pixel moves from the limits of the detection domain to the center of the detection domain. A clipping can be done so that the Max value is assigned to a more or less large zone around the center of the detection domain.

Herein, the detection domain depends on what one wants to detect. Basically, properties are defined that identify the domain. For instance, for skin tone, one wants the YUV point inside a kind of truncated simple geometric form within the YUV domain. The idea is that the correction factor cor_fac gives a slight modulation on the original histogram modification. The original histogram modification is optimal for most signal conditions, for most (80%) colors or textures. Only in some limited cases, like skin tone, grass, etc., it is desired to have a slightly different histogram modification. The detection domain limits the areas where your original histogram modification needs to be slightly adjusted. Compared to the whole YUV domain, it has to be relatively small. Otherwise, it just means that your original histogram modification is not designed properly, since it is then not suitable for most conditions.

A typical value for Max value of the correction factor cor_fac is chosen depending on the effect wanted at the center of the detection domain. One will generally choose one of the values 4, 8, 16 or 32 to allow easy computations. Then the choice is determined by:

The sensitivity required in the steps of histogram, as what one wants to avoid is to see ugly steps of the histogram in the corrected domain. For skin tone, it is preferable to be on the safe side, because one has to deal with relatively flat luminance domains and because the human eye is very sensitive in skin tone. In most cases, a value above 32 (64) is useless, considering that differential gains introduced in the histogram are never so big that one would need 64 steps in the modulation effect; and The maximum modulation that is wanted. 4 or 8 look risky, but they can be chosen if the modulation effect should not be too large. Then it is a question of normalizing the gain of the function Fy mentioned below.

The functions:

$$local\_delta\_y = Fy(cor\_fac, delta\_y)$$

$$local\_delta\_u = Fu(cor\_fac, delta\_y, U, Y)$$

$$local\_delta\_v = Fv(cor\_fac, delta\_y, V, Y)$$

are all functions for which it holds that the absolute value of the difference between local_delta_x and delta-x (with x=y, u, v) is monotonously rising with the parameter cor_fac, with the condition:

local_delta_y=delta_y for cor_fac=0 local_delta_u=delta_u for cor_fac=0 local_delta_v=delta_v for cor_fac=0 with delta_y, delta_u and delta-v equal to what one gets in the original histogram algorithm.

The advantages of this solution are that:

The whole picture, including special color or texture regions still globally benefit from the global histogram modification algorithm;

Histogram modification algorithms can be roughly optimized globally, the correction factor will do the final fine adjustment. There is no need to develop different histogram algorithms for each color/texture type;

The correction algorithms are rather independent from the global histogram modification algorithms;

The local correction allows dedicated improvements for special color or textures regions without continuity problems;

The precision of the detection domain becomes less critical because the correction factor is reduced to 0 at the limits of the domain; and The system is rather flexible. It can be reduced to its minimum, for instance with a color detector based on UV only and a correction factor which only switches off the color compensation in the UV histogram correction block. The system can be easily extended with a new additional detection domain.

The idea is as follows: in an original histogram modification, look at the Y level distribution and calculate a delta_Y. If only a correction on Y is applied, one usually gets a saturation problem. So, it is necessary to compensate by a delta_U and delta_V. A 100% correction can be chosen for, in which case delta_U=(delta_Y/Y)*U and delta_V=(delta_Y/Y)*V. It is also possible to compensate for 50% or to compensate only when delta_Y>0, which would be preferred in a dynamic contrast algorithm.

At the moment that the delta_Y is corrected locally, it is also necessary to use local_delta_y for the correction of U and V: if a 100% correction is desired, delta_U=(local_delta_y/Y)*U and delta_V=(local_delta_y/Y)*V. Basically this can be written as $$delta\_U = Fu(local\_delta\_y, U, Y) \text{ and}$$

$$delta\_V = Fv(local\_delta\_y, V, Y).$$

In the last formula, the correction factor has disappeared. It means that the same type of U, V compensation (100%, 50% or only for delta_Y>0) is made inside and outside the correction domain. Actually, situations could exist where it is not desired to have the same kind of compensation inside and outside the correction domain. That is why the following formulation is preferred:

$$delta\_U = Fu(cor\_fac, delta\_y, U, Y) \text{ and}$$

$$delta\_V = Fv(cor\_fac, delta\_y, V, Y)$$

In a practical embodiment, delta_U and delta_V are the same as local_delta_u and local_delta_v.

The formulas look actually much more complicated that it is in practice. First of all, Fu and Fv will almost always be the same, and basically in most cases:

$$Fu(cor\_fac, delta\_y, U, Y) = Fu1(delta\_y, U, Y)$$

for correction_factor=0

$$Fu2(delta\_y, U, Y)$$

for correction_factor>0 local-delta-$u$=$U$out-$U$ local-delta-$v$=$V$out-$V$

The following examples for Fy, Fu and Fv can be given:

Example 1

For skin tone, suppose that cor-fac=32 at the center of the skin domain and that it is desired to have the all the skins lighter than what the original histogram gives:

$$Fy(cor\_fac, delta\_y) = delta\_Y*(32 + cor\_fac)/32 \text{ for } delta\_Y > 0$$

$$Fy(cor\_fac, delta\_y) = delta\_Y*(32 - cor\_fac)/32 \text{ for } delta\_Y < 0$$

$Fu(cor\_fac, delta\_y, U, Y) = U*(delta\_Y*(32+cor\_fac)/32)Y$ for delta_Y<0 and $Fu(cor\_fac, delta\_y, U, Y) = U*(delta\_Y*(32-cor\_fac)/32)/Y$ for delta_Y<0

Same for Fv.

In that case, for typical skin tone, one gets:

local_delta_Y=2*delta_Y<for delta_Y<0 and local_delta_Y=0 for delta_Y<0.

This means the skin is just made lighter. The U, V compensation is 100%.

Example 2

Suppose a domain where it is not desired to change the histogram itself, but rather to do the U, V compensation differently. In the rest of the picture, one has a 100% compensation, but in that specific domain, it is just nut desired to desaturate when delta_Y<0. In that case one would choose:

$Fy(cor\_fac, delta\_y) = delta\_y$ $Fu(cor\_fac, delta\_y, U, Y) = U*(delta\_y*(32+cor\_fac)/32)/Y$, for delta_y>0, and $Fu(cor\_fac, delta\_y, U, Y) = 0$ for delta_Y<=0

Same for Fv.

The important thing in Fy, Fu and Fv is the continuity of the function.

The system is especially suitable for special color and textures. It has been applied with success to improve the performance of histogram algorithms in skin tone regions. The weak points of the prior art global histogram algorithm considered were that darker skins were made too dark, and white spots on bright faces tended to be worsened. In that case, the correction factor determines the amount of correction depending on the position in the skin domain. It is equal to 0 at the limits of the domain and to 32 at the center of the skin domain.

Figure 2:
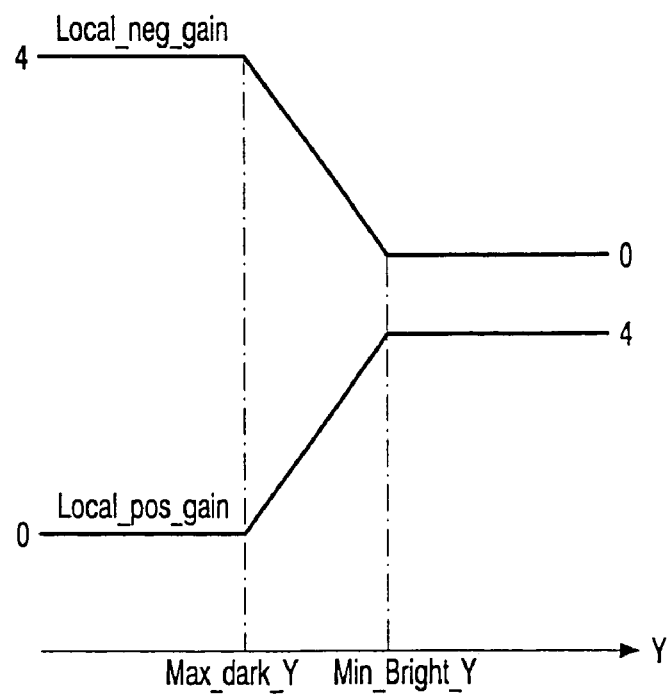
FIG. 2 shows two parameters as a function of the luminance.

The output of the local color/texture correction block 1 is:

LocalDelta_y=(Local_pos_gain(Y)*max(0,Delta_y+
max(Delta_Y,delta_yo)+Local_neg_
gain(Y)*min(0,Delta_y+min(Delta_Y,-delta_
yo)-4*Delta_y)*cor_fac/128+Delta_y where delta_yo is given a small positive value;

Local_pos_gain(Y) and Local_neg_gain(Y) are as shown in FIG. 2;

LocalDelta_u=Delta_u; and

Local_Delta_v=Delta_v

This simple algorithm helps substantially to reduce the problems of the histogram algorithm in skin tones, without creating new artifacts, nor affecting the rest of the picture. A similar concept can be applied to improve the histogram performance in other color areas, like green. The system can also be applied to textures. The input of the local measurement consists then of the YUV of the current pixel and the YUV of the neighboring pixels.

Histogram modification algorithms are contrast/detail enhancement algorithms based on the luminance level distribution measured over the whole picture. Because the measurement is made globally and does not take into account textures or color components, histogram modification algorithms can be less optimized in special texture or color regions. In particular, skin tones, which are very critical for the human eye, can be degraded by histogram algorithms. Common cases are too much black-stretch in a dark skin or too much white stretch in an already very bright skin. (Herein, dark skins and bright skins are defined by the luminance level of the skin tone; they do not refer to any racial skin differences.) Therefore, there is a need to couple locally skin tone to the histogram correction.

The basic block diagram of the skin tone/histogram algorithm is again as shown in FIG. 1. The local color/texture measurement block 1 now performs a skin-tone detection. The local color/texture correction block 5 now performs a histo-skin correction.

Basic criteria for the development of the algorithm are:

The coupling needs to remain simple. At the end of the original modification algorithm, a correction factor, coming from the skin tone detector allows a slight modulation of delta_y to local_delta_y;

This allows developing a coupling algorithm that is rather independent from the histogram modification algorithm chosen; and Different histogram algorithms are likely to go wrong in a different way in skin tone regions. 6 parameters are introduced to allow any kind of situation to be corrected. They change the gain of the histogram modification locally or add an offset to get skins darker or brighter. Different corrections can be done for dark and bright skins. The parameters are fully described below. One could also eventually couple these parameters to the skin tone angle chosen in the skin tone correction color algorithm.

The skin tone detection is very close to the one in the color algorithm block. The parameter cor_fac determines the amount of correction depending on the position in the skin domain. At the center of the skin domain, cor_fac is at maximum at a value of 32. At the limit of the skin domain, for continuity reasons, it must be equal to 0.

6 parameters allow an adjustment of the coupling skin tone-histogram:

1. max_dark_skin defines the maximum level of luminance corresponding to dark skins. max_dark_skin can be adjusted from 0 to 31 (corresponds to the index in the LUT for a given Y level).

2. min_bright_skin defines the minimum level of luminance corresponding to bright skins. min_bright_skin can be adjusted from 0 to 31 (corresponds to the index in the LUT for a given Y level). For a proper working of the algorithm, min_bright_skin should be chosen equal or higher than max_dark_skin.

3. dark_pos_gain defines the type of skin tone-histogram correction for dark skins if dark skins are boosted (delta_y>0). It can be adjusted from 0 to 4 with:

$$LocalDelta\_y = \frac{(dark\_pos\_gain - 2) * cor\_fac * Delta\_y}{64} + Delta\_y$$

for Delta_y > 0 and index(Y) < max_dark_skin 4. dark_neg_gain defines the type of skin tone-histogram correction for dark skins if dark skins are black-stretched (delta_y<0). It can be adjusted from 0 to 4 with:

$$\text{LocalDelta\_y} = \frac{(\text{dark\_neg\_gain} - 2) * \text{correction\_factor} * \text{Delta\_y}}{64} + \text{Delta\_y}$$

for delta_y < 0 and index(Y) < max_dark_skin.

5. bright_pos_gain defines the type of skin tone-histogram correction for bright skins if bright skins are boosted (delta_y>0). It can be adjusted from 0 to 4 with:

$$\text{LocalDelta\_y} = \frac{(\text{bright\_pos\_gain} - 2) * \text{correction\_factor} * \text{Delta\_y}}{64} + \text{Delta\_y}$$

for Delta_y > 0 and index(Y) > min_bright_skin.

6. bright_neg_gain defines the type of skin tone-histogram correction for bright skins if bright skin levels are reduced (delta_y<0). It can be adjusted from 0 to 4 with:

$$\text{LocalDelta\_y} = \frac{(\text{bright\_neg\_gain} - 2) * \text{correction\_factor} * \text{Delta\_y}}{64} + \text{Delta\_y}$$

for Delta_y < 0 and index(Y) > min_bright_skin.

Continuity of the Formula Around Delta_y=0

These formulas are, however, not always suitable for delta_y around 0. For instance, the situation dark_pos_gain=4 and dark_neg_gain=0 means less black-stretch of dark skins and more boosting of dark skins. This can also be interpreted simply as Dark skins should be lighter. This leads to a new formula for abs(Delta_y)≦delta_yo:

$$\text{LocalDelta\_y} = \text{Delta\_y} + \frac{\text{cor\_fac}}{64} * \left( \frac{(\text{dark\_pos\_gain} - \text{dark\_neg\_gain}) * \text{delta\_yo}}{2} + \frac{\text{cor\_fac}}{64} * \left( \frac{(\text{dark\_pos\_gain} + \text{dark\_neg\_gain})}{2} - 2 \right) * \text{Delta\_y} \right)$$

A general formula for the whole delta_y range is:

LocalDelta_y=(dark_pos_gain*max(0,Delta_y+max(Delta_y,delta_yo)+dark_neg_gain*min(0,Delta_y+min(Delta_Y,−delta_yo)−4*Delta_y)*cor_fac/128+Delta_y A similar formula is derived for bright skins around delta_y=0. In the algorithm, the value delta_yo was chosen equal to 5.

Figure 3:
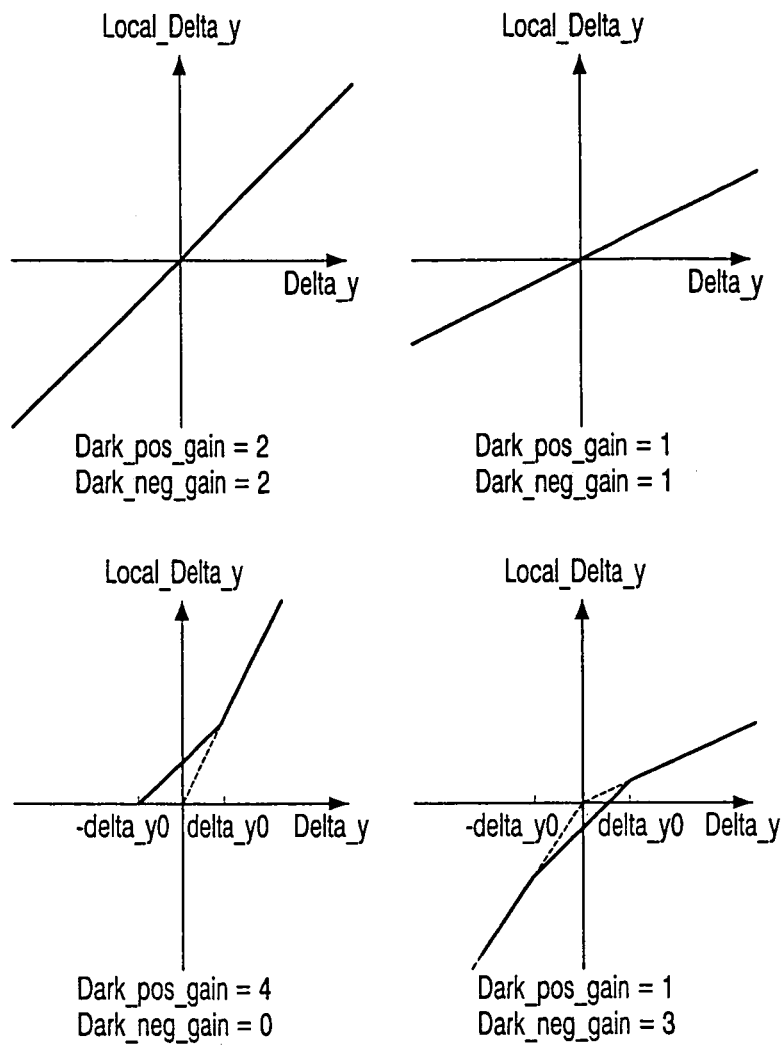
FIG. 3 shows a skin-tone to histogram correction for different parameter settings.

FIG. 3 shows Localdelta_y as function of delta_y, in the center of the skin domain (i.e., at cor_fac=32) for different combinations of dark_pos_gain and dark_neg_gain.

In this way, we get the possibility to reduce or increase the effect of histogram in dark skins, and to make dark skins lighter or darker. Similar possibilities are implemented for bright skins.

Transition Between Max_Dark_Skin and Min_Bright_Skin.

The choice of max_dark_skin and min_bright_skin allows to make different corrections on the histogram in low luminance and bright luminance regions. Normally, min_bright_skin is chosen higher than max_dark_skin. A smooth transition from dark parameters to bright parameters is made.

We then get general formulas over the whole luminance range:

$$\text{Local\_Delta\_Y} = \frac{(\text{Local\_pos\_gain} - 2) * \text{cor\_fac} * \text{delta\_y}}{64} + \text{delta\_y}$$

for Delta_y > 0 with

Local_pos_gain = dark_pos_gain for index(Y) ≤ max_dark_skin $$\text{Local\_pos\_gain} = \text{dark\_pos\_gain} + \frac{(\text{bright\_pos\_gain} - \text{dark\_pos\_gain})}{4}$$

for max_dark_skin < index(Y) ≤

$$\text{max\_dark\_skin} + \frac{\text{min\_bright\_skin} - \text{max\_dark\_skin}}{4}$$

$$\text{Local\_pos\_gain} = \text{dark\_pos\_gain} + \frac{(\text{bright\_pos\_gain} - \text{dark\_pos\_gain})}{2}$$

for $\text{max\_dark\_skin} + \frac{(\text{min\_bright\_skin} - \text{max\_dark\_skin})}{4} <$ $$\text{index}(Y) \le \text{max\_dark\_skin} + \frac{(\text{min\_bright\_skin} - \text{max\_dark\_skin})}{2}$$

$$\text{Local\_pos\_gain} = \text{bright\_pos\_gain} + \frac{(\text{dark\_pos\_gain} - \text{bright\_pos\_gain})}{2}$$

for $\text{max\_dark\_skin} + \frac{(\text{min\_bright\_skin} - \text{max\_dark\_skin})}{2} < \text{index}(Y) \le$ $$\text{max\_dark\_skin} + \frac{3 * (\text{min\_bright\_skin} - \text{max\_dark\_skin})}{4}$$

$$\text{Local\_pos\_gain} = \text{bright\_pos\_gain} + \frac{(\text{dark\_pos\_gain} - \text{bright\_pos\_gain})}{4}$$

for $\text{max\_dark\_skin} + \frac{3 * (\text{min\_bright\_skin} - \text{max\_dark\_skin})}{4} <$ index(Y) ≤ min_bright_skin Local_pos_gain = bright_pos_gain for index(Y) ≥ min_bright_skin.

In the same way, dark_neg_gain and bright_neg_gain are combined to compute Local_neg_gain. Then Localdelta_Y is computed using the general formula:

LocalDelta_y=(Local_pos_gain*max(0,Delta_y+max(Delta_Y,delta_yo)+Local_neg_gain*min(0,Delta_y+min(Delta_Y,−delta_yo)−4*Delta_y)*cor_fac/128+Delta_y The algorithm allows a modulation of the histogram modification effects in skin tone. Especially, when the dynamic contrast algorithm is used, it provides significant improvement in near-to-black skins and near-to-white skins.

The basics of the histogram are very simple. Care is only taken to provide the required continuity from dark to bright domain and from delta_y<0 to delta_y>0. The gain parameters were chosen, considering the already existing parameters for UV histogram compensation.

Histogram modification algorithms are optimized taking into account a large number of pictures. Often, compromises are made so that the algorithm performs properly in critical material, such as skin tone. The local coupling skin-tone to histogram could thus allow improving the histogram modification algorithm for the whole picture, without degrading the skin tones. The main limitation of the algorithm is actually the precision of the skin tone domain. Sometimes, the most correction would be required just within the limits of the skin tone domain. But, for continuity reasons, to avoid affecting non-skin areas, the correction has to be 0 at the limit of the skin domain. The correction proposed manages to improve most pictures.

Figure 4:
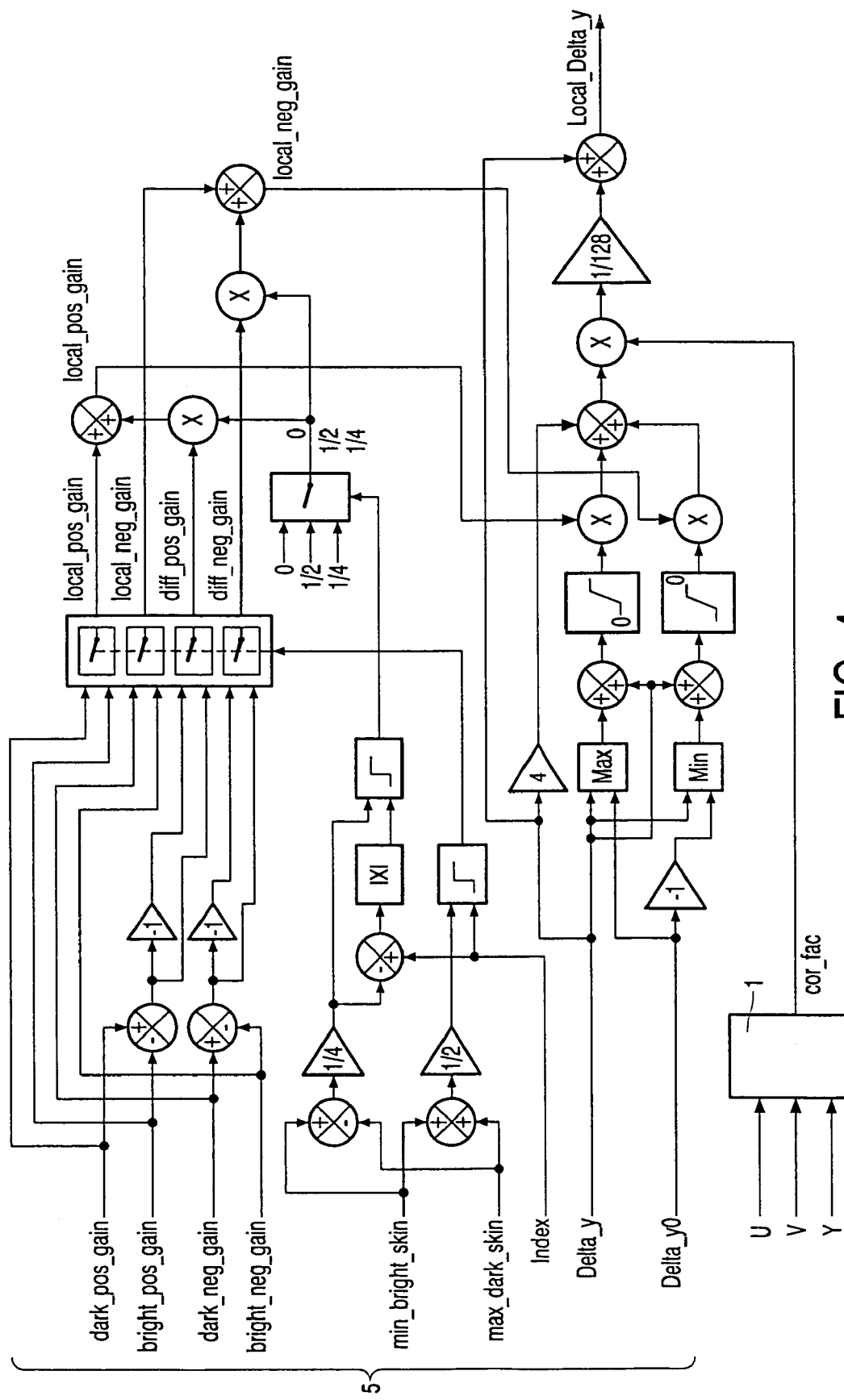
FIG. 4 shows part of the block diagram of FIG. 1 in more detail.

FIG. 4 shows a detailed embodiment of the histo-skin correction block 5, and how the skin detector 1 controls this block 5. It is just an implementation of the above formulae indicating how the parameters dark_pos_gain, bright_pos_gain, dark_neg_gain, bright_neg_gain, min_bright_skin, max_dark_skin, and index are used to obtain local_delta_y from the correction factor cor_fac and delta_y.

In an embodiment of the skin tone detection block 1, the correction factor cor_fac is derived from YUV as follows. Two axes are defined:

$$Vref1=4*U+3*V$$

$$Vref2=2.5*V-2*U-\min(Y,256)-256$$

At Y constant, the skin tone is a parallelogram defined by abs(Vref1)<min (Y, 256) and abs(Vref2)<min (Y, 256). The formulas, of course, depend on the YUV format, the original format of which is 9 bits. The important thing is that it will always look like a parallelogram in a constant Y plane.

The correction factor at Y constant is a pyramid, more details of which will be set out below.

For applications other than skin tone, the goal is to keep to a simple geometric form in no more than 3 or 4 dimensions. The trick is to define good Vref1 and Vref2 axes. Basically, it is desired to find axes where the detection domain looks like a parallelogram so that the correction factor cor_fac is easy to express as a pyramid. If there are more than 4 dimensions, one has to deal with more continuity conditions and, in most of the cases, it means really trying to isolate a very small portion, very specific portion of the signal conditions. The detection must remain quite small compared to the whole domain, but still it must be relevant.

Figure 5:
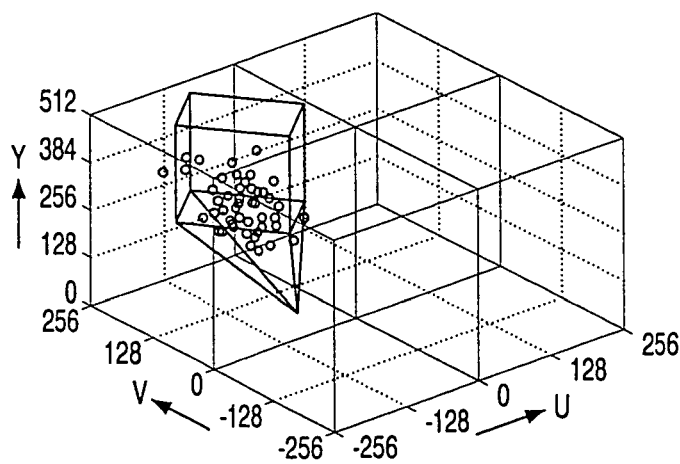
FIG. 5 illustrates the skin-tone detection domain in YUV.

Experiments show that skin tones are concentrated in YUV as shown in FIG. 5. Skin tones concentrate along an axis defined by 4*U+3*V=Vref 1. Along Vref1=0, we get the highest concentration of typical skin tones, independently from Y.

Vref1>0 corresponds to more reddish skins.

Vref1<0 corresponds to mote yellowish skins.

It we look in the UV domain alone, we find that the skin tone area is getting smaller and smaller when Y decreases. Furthermore, the center of the area is moving towards smaller UV values when Y is decreased.

At Y constant, the skin domain can be represented as a parallelogram defined by:

$$|Vref1|<\text{MaxSkinToneVariation}$$

$$|Vref2|<\text{MaxSaturationVariation}$$

with $Vref2=2.5*V-2*U-\min(Y,256)$

MaxSkinToneVariation=min(Y,256)

MaxSaturationVariation=min(Y,256)

Figure 6:
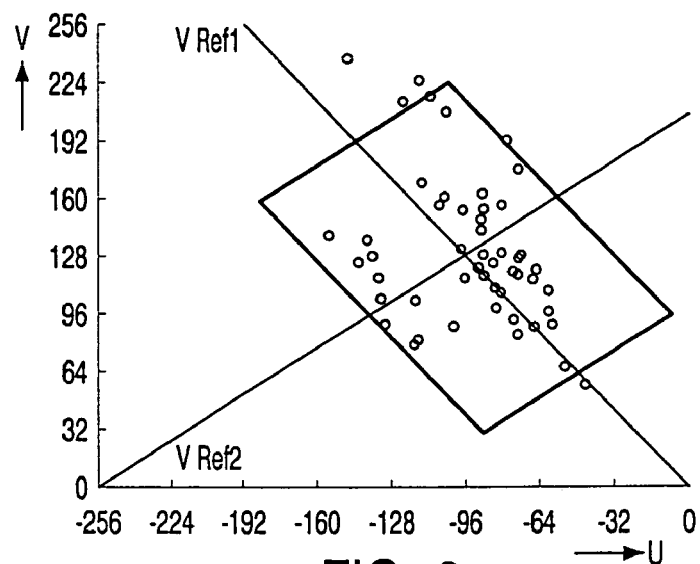
FIG. 6 illustrates the skin-tone detection domain in UV for Y>256.
Figure 7:
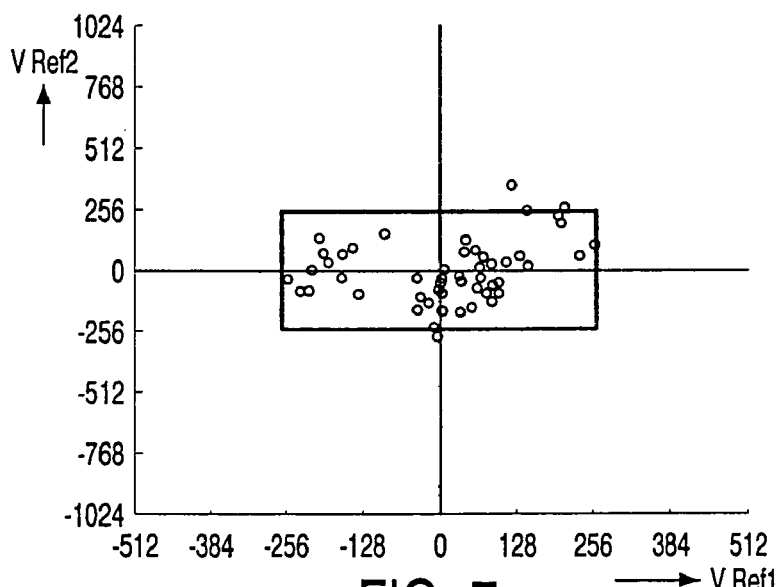
FIG. 7 illustrates the skin-tone detection domain in Vref1, Vref2 for Y>256.

FIGS. 6 and 7 show the skin tone domain in UV and Vref1, Vref2 for Y>256. The detection angles defined by Vref1, Vref2 and the limits defined by MaxSkinToneVariation, MaxSaturationVariation are a result of a compromise to include as much as possible skin tones in the domain and exclude as much as possible real yellow or red tones. Skin tones at (Vref1, Vref2)=(0,0) will be the most corrected in percentage to the histogram correction wanted specifically in skin tones. The further we go from the center of the domain, the lesser correction will be done.

Figure 8:
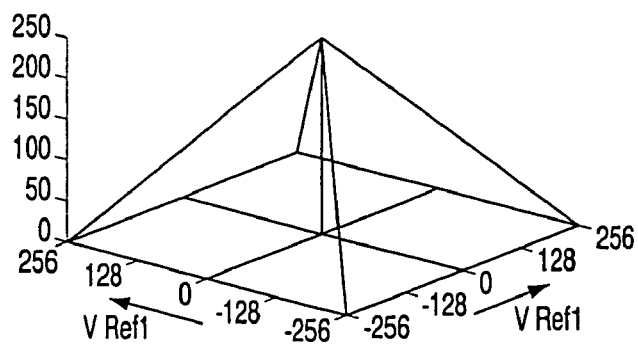
FIG. 8 illustrates the correction factor depending on the position in the skin-tone detection domain.

The pyramid of FIG. 8 defines the amount of correction (scaled to 256). It is defined by the following algorithm, in which local_y, local_u, and local_v are the local YUV values:

$$\text{Skin}VRef1=3*local\_v+4*local\_u$$

maximum skin correction SkinCorrMax= min(local_y,256)

$$\text{Skin}VRef2=5*local\_v/2-2*local\_u-256$$

SkinDistance=min(max(2*abs(SkinVRef1),2*abs(SkinVRef2)),SkinCorrMax cor_fac=min(32,64*(SkinCorrMax−SkinDistance)/max(SkinCorrMax,8))

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of picture signal enhancement, the method comprising the steps of:
   subjecting a picture signal to a histogram-based picture signal modification based on a luminance level distribution over a whole picture or a first part of the picture; and
   locally adjusting the histogram-based picture signal modification in dependence on locally measured picture signal properties other than contrast and brightness, the locally measured picture signal properties relating to second parts of the picture that are each substantially smaller than the whole picture or the first part of the picture, the second parts being within the whole picture or the first part of the picture,
   wherein a maximum local adjustment is carried out in a center of a detection domain of the locally measured picture signal properties, and no local adjustment is carried out outside or at limits of the detection domain, the local adjustment varying substantially continuously from the center of the detection domain towards the limits of the detection domain.

2. The method as claimed in claim 1, wherein the locally measured picture signal properties are color and/or texture.

3. The method as claimed in claim 2, wherein the locally measured picture signal properties indicate whether the second part relates to skin.

4. The method as claimed in claim 1, wherein the second parts are individual pixels.

5. A picture signal enhancement device, comprising:
means for subjecting a picture signal to a histogram-based picture signal modification based on a luminance level distribution over a whole picture or a first part of the picture; and
means for locally adjusting the histogram-based picture signal modification in dependence on locally measured picture signal properties other than contrast and brightness, the locally measured picture signal properties relating to second parts of the picture that are each substantially smaller than the whole picture or the first part of the picture, the second parts being within the whole picture or the first part of the picture,
wherein a maximum local adjustment is carried out in a center of a detection domain of the locally measured picture signal properties, and no local adjustment is carried out outside or at limits of the detection domain, the local adjustment varying substantially continuously from the center of the detection domain towards the limits of the detection domain.

6. A display apparatus, comprising:
a picture signal enhancement device as claimed in claim 5 for generating an enhanced picture signal; and
a display unit for displaying the enhanced picture signal.

* * * * *